April 10, 1956  G. C. COX  2,741,067
SNAP-ON SINKER
Filed June 22, 1953
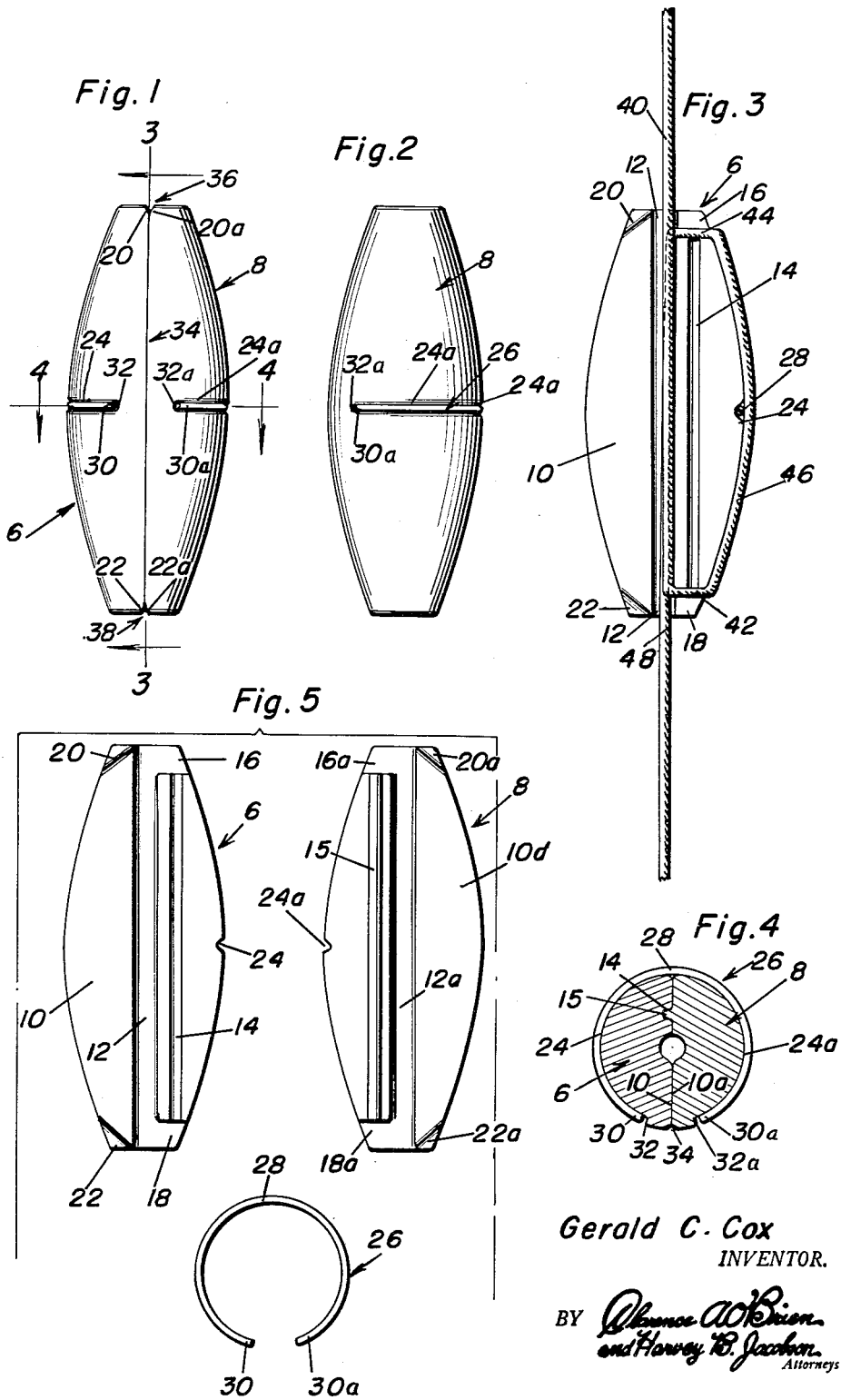
Gerald C. Cox
INVENTOR.

United States Patent Office 2,741,067
Patented Apr. 10, 1956

2,741,067
SNAP-ON SINKER

Gerald C. Cox, Gurnee, Ill., assignor of one-half to Joseph F. Schwery and one-half to Russell H. Schwery, Waukegan, Ill.

Application June 22, 1953, Serial No. 363,083

2 Claims. (Cl. 43—44.9)

This invention relates to a fishing line sinker of a type which may be readily attached to or detached from the fishing line and the object of the invention is to structurally and functionally improve upon prior art sinkers which have similar structural characteristics and are likewise such that they may be easily applied and removed.

Briefly, the improved sinker takes the form of a weight for slidable and separable association with a fishing line, said weight having an axial passage for said line and embodying a pair of spring biased components between which the line may be positioned, whereby said sinker may be readily snapped over the line for connection therewith.

Another object of the invention has to do with a weight which is approximately ellipsoidal in shape and circular in cross-section, and wherein said components are independent half-sections substantially semi-circular in cross-section.

Further novelty has to do with half-sections having flat abutting surfaces, one flat surface having a lengthwise groove providing a keyway and the companion opposed flat surface having an outstanding coextensive rib providing a key which is removably seated in said keyway.

More specifically stated, the preferred embodiment of the invention comprises a weight embodying a first section having a flat face provided with an axial groove opening through the respective ends of the sections, having an offcenter auxiliary groove paralleling said axial groove, terminating short of said ends and providing a keyway, a second section similar to said first section and having a flat face superimposed upon said first named flat face and also provided with a corresponding axial groove opposed to and lined up with said first named axial groove and cooperating therewith in defining an axial line passage, and also having an offset rib providing a key and keyed in said keyway, the external surface portions of said sections, midway between the respective ends of the sections, having cooperating keeper grooves, and a split resilient assembling and retaining ring snap-fitted in said keeper grooves and yieldingly pressing the respective flat surfaces into firm but spreadable contact and providing a normally closed lengthwise slit on one side radiating from the passage and opening through said one side and situated between adjacent spaced terminal ends of said ring.

Then, too, novelty is predicated on the construction stated wherein the keeper grooves have terminal ends which are closed, said closed ends being situated in proximity to but on opposite sides of the intervening slit and the terminal ends of said ring being co-terminus with said closed ends, the respective ends of said flat surfaces, at the respective ends of said key and keyway, being notched out and providing shallow seats and a fishing line having one end portion entering the upper end of said passage and passing downwardly through said passage, passing radially and outwardly through the notches at the lower end, looped exteriorly over the bight portion of said ring and being drawn inwardly through the notches at the upper end and then passing downwardly through said passage and out by way of the lower end of the passage.

Other objects, features, and advantages will become more readily apparent from the following description and the accompanying sheet of drawings.

In the accompanying drawings, wherein like numerals are employed to designate like parts throughout and in which:

Figure 1 is a front elevation of the improved split or sectional type sinker;

Figure 2 is a side elevational view of the same;

Figure 3 is a view showing one of the salf-sections and illustrating the manner in which the line is inserted and wrapped around in a manner to tie or join the same with the sinker so that the sinker stays put on the line, said view being approximately on the plane of the line 3—3 of Figure 1;

Figure 4 is a cross-sectional view taken on the plane of the line 4—4 of Figure 1; and Figure 5 is an exploded or group view showing the several components which go to make up the completed sinker.

With reference first to Figure 5, it will be seen that one-half section is denoted by the numeral 6 while the companion or complemental half-section is denoted by the numeral 8. The first half-section 6 has a flat surface, except for the grooves and notches, and this surface is denoted generally by the numeral 10. Formed therein is an axial semi-circular groove 12 which opens through the opposite truncated or flat ends. There is a smaller linearly straight offset groove at 14 which is close to and parallel to the groove 12 and this terminates short of the upper and lower ends constituting a keyway. The ends of the groove are formed with cut-away portions or notches 16 and 18. To the left of the channel or groove 12 are end bevels 20 and 22. Finally, the mid portion is formed exteriorly with a keeper groove 24. The complemental half-section 8 is somewhat the same in construction in that it likewise has a centered or axial channel or groove 12a which opens through the upper and lower ends. Offcenter but paralleling this groove, there is a rib 15 which terminates short of the upper and lower ends and which is adapted to fit into the keyway 14, as is obvious. The stated groove 12a is formed in the approximately flat surface 10a and this same surface is provided at the upper and lower ends with notched out portions 16a and 18a. The bevels which correspond at the upper and lower ends, are denoted by the numerals 20a and 22a respectively. The exterior, centrally disposed, keeper groove is denoted by the numeral 24a. The split or substantially C-shaped assembling, clamping and retainer ring is denoted by the numeral 26. The bight portion is denoted at 28 and the free end portions by the numerals 30 and 30a. This ring is fitted into the cooperating aligned grooves 24 and 24a, as is obvious, thus clamping the respective flat faces 10 and 10a together and seating the rib or key 15 in the keyway 14. It will be noticed in Figures 1 and 2 that the terminal ends of the keeper grooves are closed as at 32 and 32a and they are located on opposite sides of the cooperating flat faces which faces in the assembled article cooperate in defining what is called a normally closed slit 34 which radiates from and communicates with the bore or passage which is defined by the cooperating grooves 12 and 12a, as best shown perhaps in Figure 4. The terminal ends 30 and 30a terminate within the adjacent closed ends 32 and 32a of the keeper grooves. In addition to defining this spring biased, normally closed slit, the cooperating portions also define other features. That is to say, the bevels 20 and 20a define a V-shaped line inlet or pilot guide while those at the bottom, as at 22 and 22a define a similar piloting guide. The upper piloting guide is denoted conveniently at 36 and the lower one at 38. The notches 16 and 16a and 18 and 18a come together in defining upper and lower seats for the looped or wrap-around portion of the line. Since the faces forming the slit 34 are sprung together by the spring means, it will be seen that the closed slit is of a size less than the size, that is, the cross-sectional dimension of the fishing line. This means that it is necessary to press the fishing line against the respective surfaces to spring the slit open and to permit the line to feed itself into the passage. It may also be "yanked" out from the passage by way of these spring biased slit forming surfaces. Normally, the line is tied or attached to the sinker in the manner shown in Figure 3, wherein it will be seen that one portion of the line denoted at 40 passes downwardly through the upper end of the passage and then is directed laterally as at 42 through the lower notches or seat. It is then drawn upwardly along the exterior of the weight where it crosses over the bight portion 28 of the split ring and it is then drawn inwardly into the upper notches or seat as at 44 defining a wrapping or loop 46. The other end of the line 48 passes downwardly through the passage in overlapping relation with the portion 40 to complete the loop. It will be clear therefore that I have evolved and produced a simple, practical, economical and efficient sinker which is individual and distinct and possesses novel features and advantages not found in similarly constructed and performing prior art sinkers.

Since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A sinker for slidable and detachable connection with a fishing line and comprising a weight embodying a first section having a flat face provided with an axial groove opening through the respective ends of said section and having an elongated off-center auxiliary groove paralleling said axial groove with its ends terminating short of the corresponding ends of said sections to provide an elongated keyway, a second section similar to said first section and having a flat face superimposed upon said first named flat face and being provided with a corresponding axial groove opposed to and lined up with said first named axial groove and cooperating therewith in defining an open-ended axial line passage, and also having an elongated offset rib providing a key corresponding in length with and adapted to be keyed in said keyway, the external surface portions of said sections, midway between the respective ends of the sections, having aligned cooperating keeper grooves, a split resilient assembling and retaining ring snap-fitted in said keeper grooves and yieldingly pressing the respective flat surfaces of said sections into firm but spreadable contact and providing a normally closed lengthwise slit on one side of said weight radiating from said axial passage and opening through said one side and situated between adjacent spaced terminal ends of said ring, the respective flat surfaces at the respective ends of said slit having relatively small cooperating bevels defining approximately V-shaped line inlet and piloting guides which facilitate snapping the fishing line into said passage, said slit, when closed, being narrower than the cross-section of the line, the respective ends of the flat surfaces at the respective ends of said key and keyway being notched out to provide shallow seats for the accommodation and retention of portions of the fishing line, whereby a portion of said line may be formed into a loop about said rib and which functions to releasably tie the line to the weight.

2. A sinker for slidable and detachable connection with a fishing line and comprising a weight embodying a first section having a flat face provided with an axial groove opening through the respective ends of said section and having an elongated off-center auxiliary groove paralleling said axial groove with its ends terminating short of the corresponding ends of said sections to provide an elongated keyway, a second section similar to said first section and having a flat face superimposed upon said first named flat face and being provided with a corresponding axial groove opposed to and lined up with said first named axial groove and cooperating therewith in defining an open-ended axial line passage, and also having an elongated offset rib providing a key corresponding in length with and adapted to be keyed in said keyway, the external surface portions of said sections, midway between the respective ends of the sections, having aligned cooperating keeper grooves, a split resilient assembling and retaining ring snap-fitted in said keeper grooves and yieldingly pressing the respective flat surfaces of said sections into firm but spreadable contact and providing a normally closed lengthwise slit on one side of said weight radiating from said axial passage and opening through said one side and situated between adjacent spaced terminal ends of said ring, the respective ends of the flat surfaces situated in alignment with the respective ends of said key and said keyway being notched out to provide seats, said seats being in communication with said axial passage so that a portion of the fishing line may be formed into a loop about said rib and which functions to releasably tie the line to the weight, the respective end portions of the respective sections at the ends of said lengthwise slit and in positions diametrically opposite to said notches having cooperating bevels defining approximately V-shaped aligned inlet and piloting guides such that they facilitate snapping the fishing line into said passage by way of said slit.

References Cited in the file of this patent

UNITED STATES PATENTS

| | | |
|---|---|---|
| 327,100 | Palm | Sept. 29, 1885 |
| 676,724 | McCargar et al. | June 18, 1901 |
| 2,241,851 | Gilstrap | May 13, 1941 |
| 2,406,252 | Potter | Aug. 20, 1946 |
| 2,601,736 | Fisher | July 1, 1952 |
| 2,611,211 | Stockton | Sept. 23, 1952 |